United States Patent
Simonis et al.

(10) Patent No.: US 10,323,137 B2
(45) Date of Patent: Jun. 18, 2019

(54) SEALING ELEMENT

(71) Applicant: Icopal Danmark a/s, Herlev (DK)

(72) Inventors: Udo Simonis, Ronneburg (DE); Johannes Glück, Hammelburg (DE)

(73) Assignee: ICOPAL DANMARK APS, Herlev (DK)

( * ) Notice: Subject to any disclaimer, the term of this patent is extended or adjusted under 35 U.S.C. 154(b) by 129 days.

(21) Appl. No.: 15/292,296

(22) Filed: Oct. 13, 2016

(65) Prior Publication Data

US 2017/0101524 A1    Apr. 13, 2017

(30) Foreign Application Priority Data

Oct. 13, 2015  (EP) .................................. 15189486
Mar. 23, 2016  (EP) .................................. 16161855

(51) Int. Cl.
| | |
|---|---|
| *B32B 7/02* | (2019.01) |
| *C08K 13/02* | (2006.01) |
| *D06N 5/00* | (2006.01) |
| *E04D 5/06* | (2006.01) |
| *E04D 5/10* | (2006.01) |
| *C08K 5/103* | (2006.01) |
| *C08K 5/11* | (2006.01) |
| *C08K 5/1515* | (2006.01) |

(52) U.S. Cl.
CPC .............. *C08K 13/02* (2013.01); *C08K 5/103* (2013.01); *C08K 5/11* (2013.01); *C08K 5/1515* (2013.01); *D06N 5/00* (2013.01); *E04D 5/06* (2013.01); *E04D 5/10* (2013.01); *D06N 2201/02* (2013.01); *D06N 2201/082* (2013.01); *D06N 2203/048* (2013.01); *D06N 2209/1692* (2013.01); *D06N 2211/06* (2013.01); *D10B 2505/02* (2013.01)

(58) Field of Classification Search
CPC .......... C08L 27/06; C08K 5/103; C08K 5/11; C08K 5/1515; C08K 13/02; D06N 2201/02; D06N 2201/082; D06N 2203/048; D06N 2209/1692; D06N 2211/06; D06N 5/00; D10B 2505/02; E04D 5/06; E04D 5/10
See application file for complete search history.

(56) References Cited

U.S. PATENT DOCUMENTS

| | | | |
|---|---|---|---|
| 5,186,981 A * | 2/1993 | Shellhamer | B05D 3/12 427/245 |
| 5,886,072 A | 3/1999 | Linsky et al. | |
| 2004/0172899 A1* | 9/2004 | Paradise | C08L 95/00 52/302.1 |
| 2004/0198909 A1* | 10/2004 | Breitscheidel | B32B 17/10761 525/165 |
| 2008/0097004 A1* | 4/2008 | Henegar | E04D 5/06 523/135 |
| 2011/0272174 A1 | 11/2011 | Chaudhary | |
| 2012/0214920 A1 | 8/2012 | Frenkel | |
| 2013/0216839 A1* | 8/2013 | Jendoubi | B32B 27/08 428/424.6 |
| 2014/0235769 A1 | 8/2014 | Mundra et al. | |
| 2014/0309345 A1 | 10/2014 | Frenkel et al. | |
| 2014/0315021 A1* | 10/2014 | Naert | C09D 127/06 428/394 |

FOREIGN PATENT DOCUMENTS

| | | |
|---|---|---|
| EP | 1 741 551 | 1/2007 |
| WO | 00/43608 | 7/2000 |
| WO | 2012/026861 A1 | 3/2012 |
| WO | 2013/055961 A1 | 4/2013 |

OTHER PUBLICATIONS

European Search Report dated Sep. 19, 2017 for Application No. EP 17 16 7596.0.
European Search Report dated Feb. 15, 2017 for Application No. EP 16 16 1855.
Wilkes, C. E., et al., "PVC Handbook", XP002767281, Retrieved from the Internet: URL:http://files.hanser.de/hanser/docs/20050818 2581819959-57_3-446-22714-8_Leseprobe 1.pdf, retrieved on Feb. 15, 2017.

* cited by examiner

*Primary Examiner* — Lawrence D Ferguson
(74) *Attorney, Agent, or Firm* — Ladas & Parry LLP; Malcolm J. MacDonald

(57) ABSTRACT

The invention relates to a sealing element comprising at least 20-60 wt % of PVC resin, and 20-45 wt % of a biobased plasticizer.

24 Claims, 1 Drawing Sheet

SEALING ELEMENT

FIELD OF THE INVENTION

The invention relates to a sealing element as a scaling membrane, a sealing film and/or sealing layer, a composition of a sealing element, and a us of it.

BACKGROUND OF THE INVENTION

There are concerns regarding potential toxicity of certain phthalates. This causes an increasing pressure from public authorities and customers to shift towards the use of phthalate-free alternatives. Under this topic the REACH SVHC list is known where low phthalates like DEHP or DIBP are listed as reprotoxic agents, category 1B. This leads to the fact, that those substances could only be used with a specific authorisation after the sunset date of 21 Feb. 2015. So far they are not permitted in cosmetics (EU directive 2004/93/EC) and are forbidden in all toys (EU directive 2005/84/EC).

Additionally DINP, a commonly used plasticizer for synthetic roofing membranes, is said to cause cancer by the Californian government. So it can be assumed that the discussion about the health problematic of phthalates will not come to an end in the further future.

U.S. Pat No 2012/0214920 relates to a plasticizer composition comprising vicinally diacylated fatty acid esters derived from renewable feedstocks, and a process for a preparation thereof. A composition comprising a halogen-containing polymer and a plasticizer composition comprising the vicinally diacylated fatty acid esters is also described. A method for plasticizing halogen-containing polymers, such as polyvinyl chloride (PVC) resins is provided. The plasticizer compositions may be added to PVC resins in amounts ranging between 1 and 200 phr.

U.S. Pat No 2014/0235769 relates to processes for making a polyvinyl chloride dry blend composition with a phthalate-free, bio-based plasticizer and a filler, having a bulk density of greater than 0.67 g/cc and an extrusion rate of greater than 65 mg/minute for a single screw extruder of 0.75 in barrel diameter with a 25:1 L:D general purpose polyethylene screw at 75 rotations per minute screw speed, and compositions made by the processes are provided. Also the patent claims compositions with 20 to 80 wt % PVC, 10-40 wt % bio-based plasticizer and 5 to 40 wt % filler.

U.S. Pat No 2014/0309345 relates to plasticizer compositions comprising epoxidized fatty acid mono-esters and epoxy-esters. Furthermore the use of these compositions for usage in wire and cable jacketing and roofing membranes is claimed, too.

U.S. Pat No 2011/0272174 relates to PVC resin-based compositions that include biochemical plasticizers as the primary plasticizers. The compositions include PVC resin, a compatibilizer, one or more biochemical plasticizers and, optionally, a thermoplastic elastomer impact modifier. The biochemical plasticizers are present in substantial quantities in the compositions and, in some embodiments, are the only plasticizers present in the compositions. Furthermore it is claimed for compositions with 20 to 80 wt % PVC, 1 to 30 wt % compatibilizer and 5-60 wt % biochemical plasticizer. Also it is named that the biochemical plasticizer is based on an epoxidized derivative of vegetable oil or an additionally combination with an acetylated derivative of vegetable oil. These compositions could be used for cable jacketing or insulating layers.

U.S. Pat. No. 5,886,072 relates to flame retardant compositions for cable jacketing and wire insulation. The compositions consist of 100 parts PVC, 10-50 parts of an ester plasticizer that is the reaction product of a polyol consisting essentially of pentaerythritol and a mixture of fatty acids having an average carbon number of about 6.7, about 50-80 parts of aluminium trihydrate, no greater than 1-10 parts of brominated phthalate ester, about 2-20 parts of isodecyl diphenyl phosphate plasticizer, and 1-5 parts of zinc borate flame retardant, said composition being free of chlorinated polyvinyl chloride resin. Also another composition is named for cable jacketing ad wire insulation.

WO Pat No WO 2012/026861 relates to a plasticiser being an ester by reaction of a pentaerythrtiol and a monocarboxylic acid having 4-5 carbon atoms. In a further aspect the invention refers to the use in blends and in a PVC resin. The plasticiser is a non-phthalic plasticiser that has proven to have shorter fusion time and higher plasticising efficiency compared to commercial non-phthalic PVC plasticisers.

Nevertheless, these compositions are not especially developed for synthetic roofing membranes and do not comprise special ingredients for outside exposure. Here improvements in the UV stability, the ageing by high temperature (belonging to the colour of the membrane) and the resistance against microbiological attack of e.g. algaes has to be added to the composition to get a roofing membrane which could achieve long lifetime and withstand the conditions. Furthermore the ingredients have to fit the conditions of different temperature zones of the world. Also the stability against hydrolyses has to be guaranteed.

SUMMARY OF THE INVENTION

Object of the invention is among others to avoid the drawbacks of the prior art, especially to provide an environmentally friendly sealing element, preferably to be used in the field of roofings, but not restricted to them.

Briefly, the present invention relates to scaling membranes, especially roofing membranes consisting of one, two, three or multilayer system which could be reinforced by fleeces or mats or could have a fleece backing. The composition comprises PVC, biobased plasticizers, ESBO, filler, stabilizer and optionally biocides and UV stabilizers.

This invention relates to sealing membranes, especially single ply roofing membranes, which are containing phthalate-free, biobased plasticizers as their main plasticizer. Especially the usage of plasticizer based on citric acid or on pentaerythritol and valeric acid. These membranes are based on PVC-P, plasticized polyvinyl chloride, or PVC/EVA and other ingredients like filler, flame retarder, biocides and other useful additives.

According to one aspect, the invention is directed to a sealing element as a sealing membrane, a sealing film and/or a sealing layer comprising at least:

20-60 wt % of PVC resin, and 20-45 wt % of a biobased plasticizer.

Preferably the sealing element comprises at least: 45-55 wt % of PVC resin, and 28-36 wt % of a biobased plasticizer.

Preferably the sealing element comprises additionally 0-5 wt %, preferably 0.5-3 wt %, of an epoxidized soybean oil (ESBO) as secondary plasticizer.

Preferably the sealing element comprises additionally 0-30 wt % preferably 5-15 wt %, of an filler like chalk or kaoline.

Preferably the sealing element with 0.5-5 wt %, preferably 0.8-2.3 wt %, of an stabilizer based on Ca/Zn or Ba/Zn or organic stabilisers like OIT.

Preferably the sealing element with additionally 0-15 wt %, preferably 0.5-10%, of pigments such as carbon black or TiO2

Preferably the sealing element with additionally 0-5 wt % biocides like Dichloroctylisothiazolinone (DCOIT), Thiabendazole, Propicondazole, IPBC or any combinations of them.

Preferably the sealing element comprises additionally 0-10 wt % UV stabiliser like antioxidants like hindered phenols and secondary aromatic amines, hindered amine light stabilizers (HALS), Alkoxyamine hindered amine stabilizers (NOR-HALS), UV absorbers like benzophenones, antiozonantes or TiO2 or any combinations of them.

Preferably the biobased plasticizer is an ester based on a polyol and a monocarboxylic acid.

Preferably the monocarbolyxic acid is valeric acid and the polyol Pentacrythritol.

Preferably the biobased plasticizer is a citric acid ester.

Preferably the citric acid ester is acetyl trihexyl citrate (ATHC), acetyl tributyl citrate (ATBC), Acetyl trioctyl citrate or a combination of them.

Preferably the biobased plasticizer is an acetylated glycerine ester.

Preferably the acetylated glycerine ester comprises one or more of acetylated monoglyceride of fatty acid, acetylated diglyceride of fatty acid, acetylated triglyceride of fatty acid, glycerol, triacetin (glycerine triacetate), or any combination thereof.

Preferably the biobased plasticizer is an isosorbide diester. Preferably the isosorbidediester is Isosorbiddioctanoat.

Preferably the biobased plasticizer are epoxidized fatty acid alkyl esters.

Preferably epoxidized fatty acid alkyl esters are epoxidized fatty acid methyl ester.

Preferably the biobased plasticizer is a phthalate replacement plasticizer.

Preferably the biobased plasticizer is a cardanol based ester which is gained by esterification of Cardanol or epoxidized Cardanol.

Preferably the phthalate replacement plasticizer is Dioctylterphthalate (DOTP).

Preferably the phthalate replacement plasticizer is 1,2-Cyclohexandicarbonacid diisononylester (DINCH).

According to another aspect, the invention is directed to a sealing element composition comprising substances or combinations of them according to at least one of the preceding claims.

In another aspect, the invention is directed to a use of a sealing element, wherein the sealing element is a roofing or a part of it or a single ply or layer roofing membrane or multi-ply or multi layer roofing membrane.

Preferably the sealing element is a homogenous, one layer roofing membrane with a thickness between 0.8 to 2.5 mm, preferably 1.2 to 1.5 mm.

Preferably the sealing element is a two layer roofing membrane with a thickness of 1.0 to 2.5 mm, preferably 1.2 to 1.5 mm, said membrane having a reinforcement layer or an inlayer arranged between the two layers.

Preferably the reinforcement layer is an element of the group PET or glass based scrim, fabric, mats, fleece or any combinations of them, having a thickness of 0.2 to 0.7 mm and/or grammages of 30 to 130 g/m².

Preferably the sealing element is a multi-layer roofing membrane with a thickness of 1.2 to 2.5 mm, preferably 1.5 and 1.8 mm, said membrane having at least one reinforcement layer or an inlayer arranged between layers of the membrane.

Preferably the reinforcement layer is an element of the group PET or glass based scrim, fabric, mat, fleece or any combinations of them, having a thickness of 0.2 to 0.7 mm and/or grammages of 30 to 130 g/m².

Preferably the roofing membrane is additionally backed by a PET or glass-nonwoven with 50 to 500 g/m², preferably 150-300 g/m², for a glued application or used as separation layer.

Preferably the roofing membrane comprises a lacquering on its top side with a thicknesses of 4 to 30 μm, preferably based on acrylic or polyamide or fluorcarbons or PUR containing polymers or any combinations of them.

Preferably the roofing membrane comprises of one or more layers based on expanded or foamed PVC by adding a foaming agent in the range of 0-6 wt %, preferably 1-3 wt %.

Preferably the foaming agents are expandable, thermoplastic microspheres.

Preferably the roofing membrane is used as pond liner, dancefloor, flooring, pool liner or sealing membrane for the building waterproofing sector.

BRIEF DESCRIPTION OF THE DRAWINGS

Further features and advantages will become clear from the following detailed description made with reference to the drawings in which.

DETAILED DESCRIPTION

Figure 1:
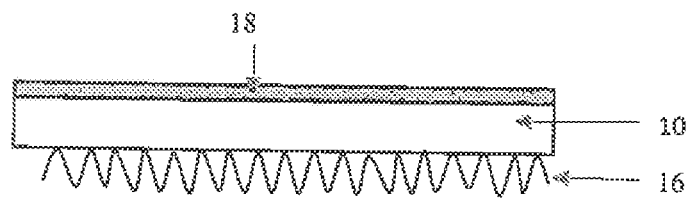
FIG. 1 is a cross-sectional view of the one layer system with or without fleece backing and with or without an additional lacquering on the topside

In a first aspect the invention relates to a composition for sealing membranes exhibiting the weather conditions in middle Europe by using following ingredients:

20-60 wt % PVC resin 20-45 wt % of an biobased plasticizer 0-5 wt % of an ESBO, epoxidized soyabean oil as secondary plasticizer 0-30 wt % of an filler such as chalk or kaoline 0-5 wt % of an stabilizer based on Ca/Zn or Ba/Zn or organic stabilisers like OIT ageing thermostability systems 0-15 wt % of pigments such as carbon black or TiO2

0-5 wt % biocides as example DCOIT (Dichloroctylisothiazolinone), Thiabendazole, Propiconazole, IPBC or any combinations of them 0-10 wt % UV stabiliser like antioxidants like hindered phenols and secondary aromatic amines, HALS (hindered amine light stabilizers), Alkoxyamine hindered amine stabilizers (NOR-HALS), UV absorbers like benzophenones, antiozonantes, or TiO2 and any combinations of them.

In one case the plasticizer could be based on pentaerythritol and valeric acid which form together a polyolester plasticizer called 2,2-bis[[(1-oxopentyl)oxy]methyl]propane-1,3-diyl divalerate, but also polyolesters which formed by a reaction of a polyol and monocarboxylic acid with the structure shown hereinafter where R1, R2, R3 and R4 represents —O—CO-alkyl groups containing 4-5 carbon atoms, wherein said polyol is pentaerythritol and wherein said —O—CO-alkyl group is selected from the group consisting of butyrate, valerate and a mixture thereof.

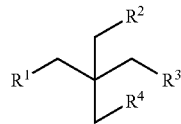

Chemical Structure for Polyolesters

Furthermore the biobased plasticizer could be made from citric acid with the structure wherein the citrate ester has the formula as shown hereinafter wherein each R1, which can be the same or different from each other, is selected from H, a C1 to C18 aliphatic group or alicyclic group, or R2(OR3)m- wherein R2 is a C1, to C18 aliphatic group, R3 is a C1 to C8 alkyl group, and m is an integer from 1 to 15. One embodiment the biobased citrate ester is ATHC (acetyl trihexyl citrate), ATBC (acetyl tributyl citrate), Acetyl trioctyl citrate or a combination of them in any ratio.

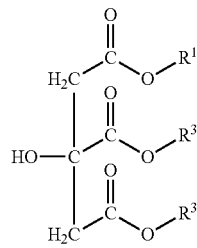

Chemical Structure of Citrate Esters

Other possibilities for biobased plasticizers could be acetylated glycerine esters as shown hereinafter, wherein R1, R2 and R3 each individually represent an acetyl group or a hydrogen atom and at least one of R1-R3 comprises a fatty acid moiety with 4 to 22 carbon atoms. In one embodiment one or two R groups are acetyl groups. Furthermore the acetylated glycerine ester comprises one or more of acetylated monoglyceride of fatty acid, acetylated diglyceride of fatty acid, acetylated triglyceride of fatty acid, glycerol, triacetin (glycerine triacetate), and any combination thereof.

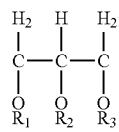

Chemical Structure of Acetylated Glycerine Esters

Another embodiment are isosorbide dieesters with the structure shown hereinafter, wherein R, Ra and Rb in each case independently from each other linear or branched, saturated alkyl groups with 5 till 11, preferably 7-9 and especially preferred 7 carbon atoms or linear or branched, one or several, unsaturated alkylen groups with 5 till 11, preferably 7 till 9, and especially preferred 7 carbon atoms are. One example is Isosorbiddioctanoat (produced of Isosorbid and Octan acid which could be manufactured from palm oil).

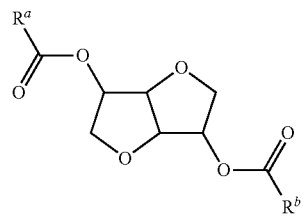

Structure of Isosorbide Diesters

Another possibility for biobased plasticizers could be epoxidized fatty acids alkyl esters with fatty acid alkyl esters with the structure R1-C(O)O—R2 where R1 represents one or more of saturated, mono-unsaturated, and polyunsaturated C13 to C23 straight-chain hydrocarbyl groups, and R2 is a linear or branched C1 to C8 alkyl group. Those Fatty acid alkyl esters are after esterification epoxidized by using conventional method that means by contact with an acid and an aqueus peroxide solution to thereby produce an epoxidized reaction mixture comprising epoxidizied fatty acid alkyl esters, residual acid, residual peroxide and water. Following epoxidation the residual acid, peroxide and water is removed from epoxidized reaction mixture via layer separation and neutralization. Especially the epoxidizied fatty acid methyl esters (that means the fatty acid alkyl ester structure where R2 represents a methyl group) are used as biobased plasticizer in this application.

Another embodiment are cardanol based esters. Cardanol, a phenolic lipid obtained from anacardic acid which is the main component of cashew nutshell liquid (CNSL) with the structure shown hereinafter, wherein R=C15H31−n; n=0, 2, 4, 6 is standing in the metaposition and has minimum three double bonds.

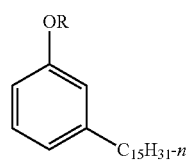 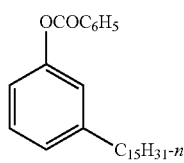 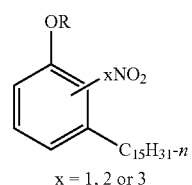

Etherification  Esterification  Nitration

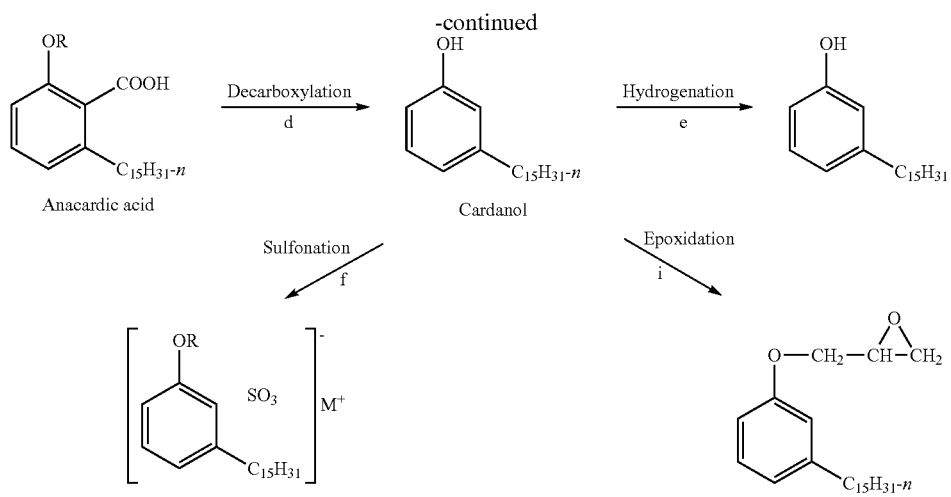

Production of Cardanol and the Resulting Products

The ester of Cardanol is gained when the reaction between Cardanol and an alcohol R—OH is done wherein R in the alcohol stands for alkyl groups. The ester made from Cardanol has the structure shown hereinafter, wherein R1 and R2 show organically rests. R1=C15H31-n; n=0, 2, 4, 6 is a 15 carbon containing aliphatic chain, R2 on the other hand is in one case a Phenyl group.

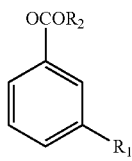

The Cardanol Ester Structure

In another case an epoxidized Cardanol which could be gained by reacting with epichlorohydrine (see Epoxidation product above). The reaction with an Alcohol, R—OH wherein R is of the alkyl group, forms another structure shown hereinafter

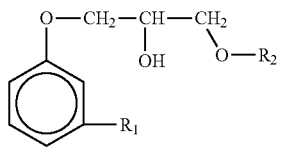

Structure of Compound after Epoxidized Cardanol Reacts with an Alcohol where R1 is a 15 carbon atom aliphatic chain containing one, two or three non-conjugated double bonds and has the formula —[CH2]7-C7Hio-i4-CH3 and R2 is selected from the group consisting alkyls, and aryls optionally having one or more functional groups, and the oxygen is bonded to any carbon of R2.

Furthermore the plasticizer could be DOTP—Dioctylterphthalate—or DINCH—1,2-Cyclohexandicarbonacid diisononylester—which are no biobased plasticizer but replacements for the phthalates which are used today.

Another embodiment are any combination of the named plasticizers respectively plasticizer groups which are (partly) based on renewable sources or todays replacements for phthalates. According to the used biobased raw material the biobased content could vary from 2 to 100% for the plasticizers.

In general biobased in this content means that the raw materials which are used for the production of this plasticizer are made from renewable, carbon based, organic materials. These materials are made from biomass e.g. bio polymers, sugar, starch, lignocellulose—that means plants such as sugarcane, cellulose, corn, wheats, other grains, potatoes—, palm oil, soybean oil and others. From these biomass you could gain the molecular classes alcohols, aldehyds, alkanes, alkenes, alkynes, allenes, amides, amines, anhydrides, aromatics, carboxylic acids, esters, ethers, haloalkanes, ketones, nitriles, thiols, which are necessary for creating biobased plasticizers.

The first aspect is that the sealing membrane is used as waterproofing membrane especially as single ply roofing membrane.

Here the build-up of the roofing membrane is necessary. First possibility would be to establish a one layer membrane (10) without any reinforcement (FIG. 1), sometimes also called homogenous membrane. This membrane could have thicknesses between 0.8 to 2.5 mm, preferably 1.2 to 1.5 mm. This membrane could also be produced with a small lacquering (18) of 4 to 30 µm based on acrylic or polyamide or fluorocarbons containing polymers or any combinations of them. Which should protect the membrane. Furthermore this membrane could have a fleece backing (16) made of a PET or a glass-nonwoven with 50 to 500 g/m$^2$, preferably 200-300 g/m$^2$, for a glued application or used as separation layer.

Figure 2:
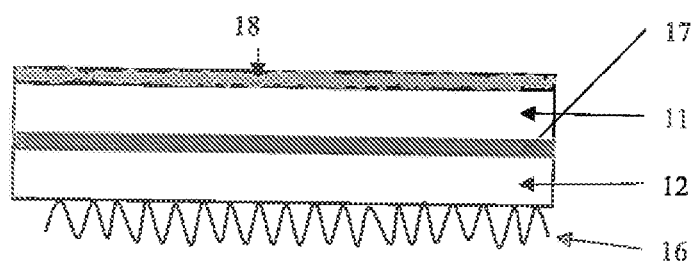
FIG. 2 is a cross-sectional view of the two layer system with reinforcement and with or without additional fleece backing and with or without an additional lacquering on the topside

The second possibility for the build-up of the roofing membrane could be to have a two layer system (FIG. 2) where the total thickness of the membrane ranges from 1.0 to 2.5 mm, preferably 1.2 to 1.5 mm. Here the advantage is that a reinforcement or inlayer (17) could be placed between the two layers: top layer (11) and bottom layer (12) and improve the mechanical values of the membrane. Potential reinforcements would be PET or glass based scrims, fabrics, mats or fleeces, or any combinations of them with thicknesses of 0.2 to 0.7 mm and grammages of 30 to 130 g/m. Additionally a lacquering (18) could be attached on the top layer in levels from 4 to 30 µm based on acrylic or polyamide or fluorocarbons containing polymers or any combinations of them. Furthermore the membrane could have a fleece backing (16) made of a PET or glass-nonwoven with 50 to 500 g/m, preferably 200-300 g/m², for a glued application or used as separation layer.

Figure 3:
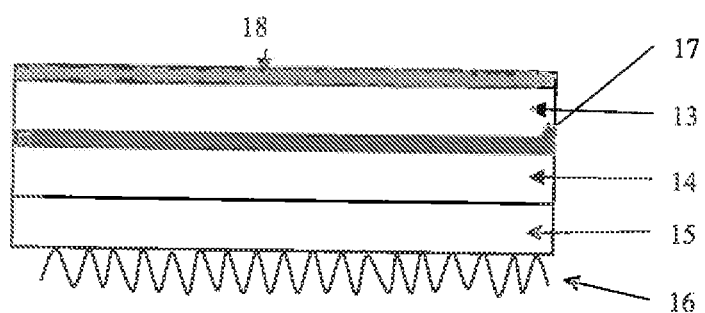
FIG. 3 is a cross sectional view of the three layer system with reinforcement and with or without additional fleece backing and with or without an additional lacquering on the topside

The third possibility for the roofing membrane could be a multiple layer system, as example a three layer system (FIG. 3): bottom layer (15), middle layer (14) and top layer (13) where the total thickness of the membrane could range from 1.0 to 2.5 mm, preferably 1.2, 1.5 and 1.8 mm. Here the advantage is that a reinforcement (17) could be added and that only the top, and maybe the middle layer, get a UV-stability and biocide package. As reinforcement PET or glass scrims, fabrics, mats or fleeces and any combinations of them could be possible in thicknesses of 0.2 to 0.7 mm and grammages of 30 to 130 g/m².

Nevertheless, the reinforcement could be positioned between top and middle or between middle and bottom layer. Furthermore an additionally lacquering (18) could be put on the top layer from 4 to 30 μm based on acrylic or polyamide or fluorcarbons containing polymers or any combinations of them. Also possible would be a fleece backing (16) made of a PET or a glass-nonwoven with 50 to 500 g/m², preferably 150-300 g/n, for a glued application or used as separation layer. Another possibility could be that one or more layers of the membrane are made of expanded or foamed PVC. This means that for one or more layer of the membrane a foaming agent is used to expand the material, e.g. expandable thermoplastic microspheres. The built-up of these materials is a polymer shell which is encapsulating a propellant which is expanding at higher temperatures. These materials are expanding when they are leaving the die (the inside pressure of the extruder is high enough to prevent expanding inside the extruder). As amount 0-6%, preferably 1-3 wt % of foaming agent is used for such compositions. The advantage for a foamed PVC layer is a lower weight of the membrane and lower material input. Also it could have an insulating effect on the whole construction and a reduction of the μ-value. Also interesting is the fact that the membrane could resist hail damage because of the expanded or foamed layer could absorb the impact energy of hailstones but it is still flexible enough to be winded on rolls.

The second aspect is that the invention could be used as pond liner, dancefloor, flooring, pool liner or other sealing membranes for the building waterproofing sector. The build-up could be in the same way like mentioned for the roofing membranes before.

Manufacturing Process

First step in the manufacturing progress would be the mixing of the ingredients, otherwise called the dry blend. Therefore all ingredients are mixed at temperatures between 50 and 130° C. degrees to form a homogenous material. The most important step is to mix as a first step the PVC and the plasticizer and afterwards to add the rest of the ingredients so that the plasticizer could penetrate the PVC corns in the best way.

After the dry blend is finished, the material could be produced by the commonly known production possibilities such as extrusion, coextrusion, coating or calendaring. Here the standardly used parameters could be used. The last step is the winding of the finished material as Jumbo rolls or rolls in the length which are today normally from 10 to 25 m and widths of 1000-3000 mm. But nevertheless, other length and width are possible.

Investigations

The advantage of the biobased plasticizers should not only be considered by the fact of the renewable resources, also the effectivity of the plasticizer is a reason for its use. Especially the hardness or flexibility, measured as Shore A hardness, and the plasticizer uptake from the PVC are therefore useful investigations.

TABLE 1

| Exemplary formulations (in wt %) | | | | | | | |
|---|---|---|---|---|---|---|---|
| DINP | 28-36 | | | | | | |
| DPHP | | 28-36 | | | | | |
| Polyolester | | | 28-36 | | | | |
| Citrate ester | | | | 28-36 | | | |
| Isosorbide diester | | | | | 28-36 | | |
| Epoxidized Fatty Acid Methyl esters | | | | | | 28-36 | |
| Acetylated glycerine esters | | | | | | | 28-36 |
| ESO | 0.5-3 | 0.5-3 | 0.5-3 | 0.5-3 | 0.5-3 | 0.5-3 | 0.5-3 |
| S-PVC K70 | 45-55 | 45-55 | 45-55 | 45-55 | 45-55 | 45-55 | 45-55 |
| Chalk | 5-13 | 5-13 | 5-13 | 5-13 | 5-13 | 5-13 | 5-13 |
| Stabilizer | 0.8-2.3 | 0.8-2.3 | 0.8-2.3 | 0.8-2.3 | 0.8-2.3 | 0.8-2.3 | 0.8-2.3 |

Table 1 shows exemplary formulations which are used for the later test investigations. With this formulations Dry blends, that means the PVC and all additives like plasticizers, UV stabilisers, etc., are thoroughly mixed together in a lab mixing unit. To get the same prehistory for each type of plasticizer and mixture, the same procedure is done. It starts with the mixing step in the hot mixer until the temperature reaches 70° C. While opening the hot mixer to put all the material from the edge and the cover into the middle to get a homogenous mass, the cold mixing unit is switched on. After that the material is heated up to 120° C. At this temperature the gateway to the cold mixer is opened and the material runs from the hot into the cold mixer. It has to stay there until it achieves a temperature of approximately 50-55° C.

The dry blends of the preliminary stage are pressed respectively fused to a membrane. Therefore a measuring roll mill with two rolls is used. Under 10% friction, that means that the front roll has a speed of 10 rpm and the back roll a speed of 9 rpm, the rolled sheets are processed for 5 minutes under intensive mixing and a roll gap of 0.9 mm to get an end thickness of 1.1 mm per one. The temperatures of the rolls are: for the front roll 165° C. and for the back roll 160° C. Table 2: Shore hardness results

| Formulation | Shore A | Shore D |
|---|---|---|
| 1 | 74 | 22 |
| 2 | 77 | 24 |
| 3 | 70 | 22 |
| 4 | 76 | 22 |
| 5 | 77 | 23 |

-continued

| Formulation | Shore A | Shore D |
|---|---|---|
| 6 | 74 | 23 |
| 7 | 74 | 20 |

Table 2 compares the Shore A and D values, measured according to ISO 7619-1, between the standardly used phthalates and the biobased plasticizers. They show the same or smaller hardness values. The smaller hardness values will lead to a reduction of the plasticizer content in the later produced material to get the same hardness than what is achieved the standard materials. Here the biobased formulations 3, 6 and 7 achieve a lower hardness than the standard formulation 1.

TABLE 3

Plasticizer uptake

| Formulation | Plasticizer uptake/% |
|---|---|
| 1 | 31.5 |
| 2 | 31.4 |
| 3 | 32.2 |
| 4 | 32.3 |
| 5 | 32.5 |
| 6 | 33.6 |
| 7 | 31.9 |

Table 3 shows the relatively plasticizer uptake, according to ISO 4628, which is a necessary investigation: the higher the plasticizer absorption, the better are the porous PVC corns penetrated with the plasticizer. Here the biobased plasticizers show better results than the phthalates.

TABLE 4

Short term volatility test

| Formulation | Weight loss/% |
|---|---|
| 1 | −1.12 |
| 2 | −1.19 |
| 3 | −0.82 |
| 4 | −5.75 |
| 5 | −1.14 |
| 6 | −3.09 |
| 7 | −8.74 |

Table 4 shows the result of the short term volatility test which is performed at 130° C. for a storage of 24 h. Nevertheless, these are extremely high conditions which should show in an accelerated way the ageing behaviour at high temperature. Here formulation 3, 6 and 7 show higher weight loss than the other formulations.

TABLE 5

Glass transition temperature

| Formulation | Tg/° C. |
|---|---|
| 1 | −40.0 |
| 2 | −40.0 |
| 3 | −30.0 |
| 4 | −40.0 |
| 5 | −36.0 |
| 6 | −29.0 |
| 7 | −45.0 |

The glass transition temperature has been measured via DMA, Dynamic Mechanical Anlalysis, from Rheometrics called Rheometric Dynamic Analyzer (RDA II). It has been tested according ISO 6721-7. The DMA analysis, especially the Glass transition temperature gives an indication how the behaviour at low temperatures will be. This means: the lower the glass transition temperature, the lower will be temperature where the material will keep flexible and won't be destroyed. The results show that formulation 7 shows better results than rest which has been tested.

The invention claimed is:

1. A sealing membrane used in the building waterproofing sector, comprising:
   20-60 wt % of a polyvinyl chloride resin,
   20-45 wt % of a biobased plasticizer that is an ester based on valeric acid and pentarythritol, and
   0.5-5 wt % of a stabilizer based on Ca/Zn, Ba/Zn, or an organic stabilizer.

2. The sealing membrane according to claim 1, comprising 55 wt % of the polyvinyl chloride resin, and 28-36 wt % of the biobased plasticizer.

3. The sealing membrane according to claim 1, further comprising:
   0-5 wt % of an epoxidized soybean oil as a secondary plasticizer, and/or
   0-30 wt %, of a filler, and/or
   0-15 wt % of a pigment, and/or
   0-5 wt % of a biocide, and/or
   0-10 wt % of a UV stabilizer.

4. A waterproofing membrane composition comprising the sealing membrane according to claim 1.

5. The waterproofing membrane composition according to claim 4,
   wherein the sealing membrane is selected from the group consisting of a roofing, a part of the roofing, a single ply roofing membrane, or a multi-ply roofing membrane,
   wherein the sealing membrane is a homogenous, one layer roofing membrane with a thickness between 0.8 to 2.5 mm, or
   wherein the sealing membrane is a two layer roofing membrane with a thickness of 1.0 to 2.5 mm, and
   wherein said two-layer roofing membrane has a reinforcement layer arranged between the two layers, and having a thickness of 0.2 to 0.7 mm and/or grammages of 30 to 130 g/m$^2$.

6. The waterproofing membrane composition according to claim 5, wherein the sealing membrane is a multi-layer roofing membrane with a thickness of 1.2 to 2.5 mm, said multi-layer roofing membrane having a reinforcement layer arranged between two layers of the membrane, said reinforcement layer having a thickness of 0.2 to 0.7 mm and/or grammages of 30 to 130 g/m$^2$.

7. The waterproofing membrane composition according to claim 5, wherein the roofing membrane further comprises a polyethylene terephthalate- or glass-nonwoven backing with 50 to 500 g/m$^2$, for a glued application, or used as a separation layer, and
   wherein a top side of the roofing membrane comprises a lacquering having a thickness of 4 to 30 µm.

8. The waterproofing membrane composition according to claim 5, wherein the roofing membrane comprises one or more layers based on expanded or foamed polyvinyl chloride by adding a foaming agent in the range of 0-6 wt %.

9. The waterproofing membrane composition according to claim 5, wherein the reinforcement layer is a member selected from the group consisting of a polyethylene terephthalate- or glass-based scrim, a fabric, a mat, a fleece, and a combination thereof.

10. The waterproofing membrane composition according to claim 5, wherein the lacquering is based on a member selected from the group consisting of an acrylic, a polyamide, a fluorocarbon- or polyurethane-containing polymer, and a combination thereof.

11. The waterproofing membrane composition according to claim 5, wherein the foaming agent comprises expandable, thermoplastic microspheres.

12. A sealing membrane used in the building waterproofing sector, comprising:
20-60 wt % of a polyvinyl chloride resin,
20-45 wt % of a biobased plasticizer that is an epoxidized fatty acid methyl ester, and
0.5-5 wt % of a stabilizer based on Ca/Zn, Ba/Zn, or an organic stabilizer.

13. The sealing membrane according to claim 12, comprising 55 wt % of the polyvinyl chloride resin, and 28-36 wt % of the biobased plasticizer.

14. The sealing membrane according to claim 12, further comprising:
0-5 wt % of an epoxidized soybean oil as a secondary plasticizer, and/or
0-30 wt %, of a filler, and/or
0-15 wt % of a pigment, and/or
0-5 wt % of a biocide, and/or
0-10 wt % of a UV stabilizer.

15. A waterproofing membrane composition comprising the sealing membrane according to claim 12.

16. The waterproofing membrane composition according to claim 15,
wherein the sealing membrane is selected from the group consisting of a roofing, a part of the roofing, a single ply roofing membrane, or a multi-ply roofing membrane,
wherein the sealing membrane is a homogenous, one layer roofing membrane with a thickness between 0.8 to 2.5 mm, or
wherein the sealing membrane is a two layer roofing membrane with a thickness of 1.0 to 2.5 mm, and
wherein said two-layer roofing membrane has a reinforcement layer arranged between the two layers, and having a thickness of 0.2 to 0.7 mm and/or grammages of 30 to 130 $g/m^2$.

17. The waterproofing membrane composition according to claim 16, wherein the sealing membrane is a multi-layer roofing membrane with a thickness of 1.2 to 2.5 mm, said multi-layer roofing membrane having a reinforcement layer arranged between two layers of the membrane, said reinforcement layer having a thickness of 0.2 to 0.7 mm and/or grammages of 30 to 130 $g/m^2$.

18. The waterproofing membrane composition according to claim 16, wherein the roofing membrane further comprises a polyethylene terephthalate- or glass-nonwoven backing with 50 to 500 $g/m^2$, for a glued application, or used as a separation layer, and
wherein a top side of the roofing membrane comprises a lacquering having a thickness of 4 to 30 μm.

19. The waterproofing membrane composition according to claim 16, wherein the roofing membrane comprises one or more layers based on expanded or foamed polyvinyl chloride by adding a foaming agent in the range of 0-6 wt %.

20. The waterproofing membrane composition according to claim 16, wherein the reinforcement layer is a member selected from the group consisting of a polyethylene terephthalate- or glass- based scrim, a fabric, a mat, a fleece, and a combination thereof.

21. The waterproofing membrane composition according to claim 16, wherein the lacquering is based on a member selected from the group consisting of an acrylic, a polyamide, a fluorocarbon- or polyurethane-containing polymer, and a combination thereof.

22. The waterproofing membrane composition according to claim 16, wherein the foaming agent comprises expandable, thermoplastic microspheres.

23. A sealing membrane used in the building waterproofing sector, comprising:
20-60 wt % of a polyvinyl chloride resin,
20-45 wt % of a biobased plasticizer that is an acetylated glycerine ester selected from the group consisting of an acetylated monoglyceride of a fatty acid, an acetylated diglyceride of a fatty acid, an acetylated triglyceride of a fatty acid, glycerol, glycerine triacetate, and a combination thereof, and
0.5-5 wt % of a stabilizer based on Ca/Zn, Ba/Zn, or an organic stabilizer.

24. A waterproofing membrane composition comprising the sealing membrane according to claim 23.

* * * * *